Sept. 21, 1937.    R. WOODHEAD ET AL    2,093,585
ARTIFICIAL FLY
Filed June 15, 1936
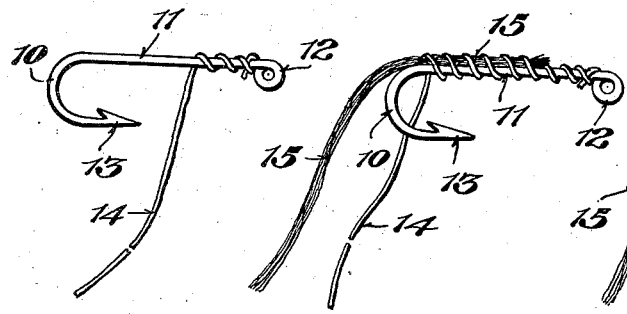
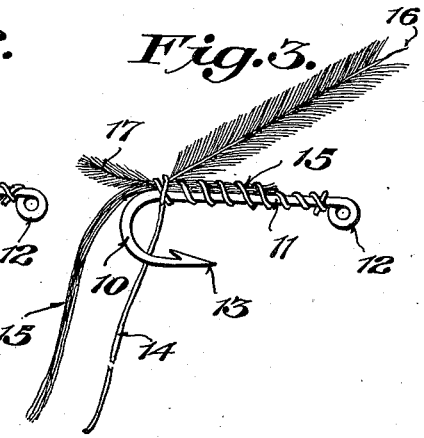
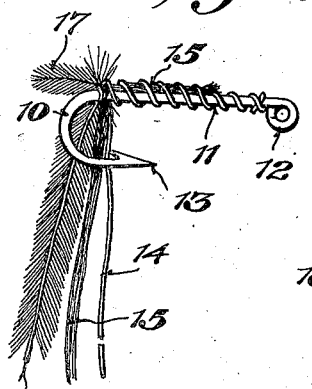
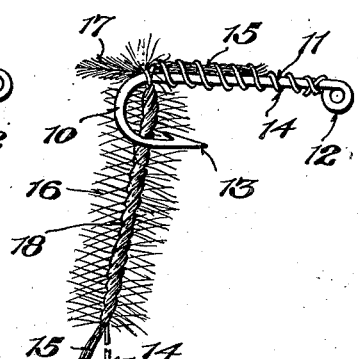
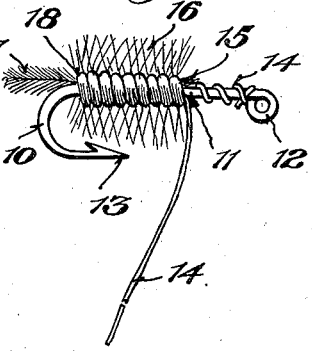
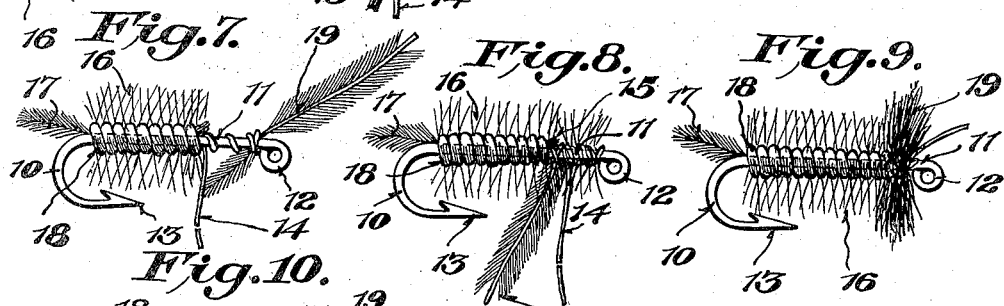
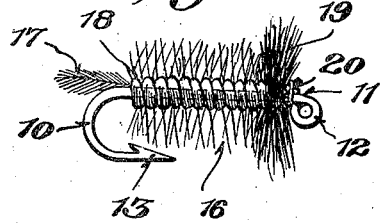
Inventors
Raymond Woodhead,
Harry Woodhead,
By Cushman, Darby, & Cushman
Attorneys Patented Sept. 21, 1937

2,093,585

UNITED STATES PATENT OFFICE 2,093,585

ARTIFICIAL FLY

Raymond Woodhead and Harry Woodhead, Superior, Wyo.

Application June 15, 1936, Serial No. 85,386

10 Claims. (Cl. 43—48)

This invention relates to artificial flies and the method of making the same.

An object of the invention is to provide a fly particularly adapted for trout fishing, although it may be utilized to advantage as bait for other types of fish.

Another object is to construct an artificial fly capable of floating upon the water in simulation of insects and flies, and which is strong and durable in construction and capable of repeated use.

With the foregoing and other objects in view, the invention will be more particularly described, reference being had to the accompanying drawing in which Fig. 1 is an elevation of a fishhook illustrating the preparatory step of wrapping a working thread about the shank of the hook;

Fig. 2 illustrates the step of securing the ends of the rayon and silk threads to the shank of the hook;

Fig. 3 illustrates the step of securing the end of the rear feather to the hook;

Fig. 4 illustrates the feather, working, rayon and silk threads depending from the hook before the twisting operation;

Fig. 5 illustrates the feather, working, rayon, and silk threads depending from the hook after being twisted together;

Fig. 6 illustrates the twisted feather and threads after being wrapped around the hook to form the body of the fly;

Fig. 7 illustrates the preparatory step of securing the front hackle feature to the hook in advance of the body portion;

Fig. 8 illustrates the front hackle feather after being wrapped inwardly from the eye of the hook to the body portion;

Fig. 9 illustrates the front hackle feather after being wrapped both inwardly to the body portion and then forward to the eye of the hook, and Fig. 10 illustrates a side elevation of the completed fly after the working thread has been wrapped around the front hackle feather to secure the same to the hook.

Referring to the drawing, the numeral 10 designates the common type of fish hook having an elongated shank 11 provided at one end with an eye 12, while the other end is bent as usual and terminates in a barb 13. The initial step of our process as illustrated in Figure 1, consists in taking a thread 14, preferably waxed, and which will hereafter be called the working thread, securing one end of the thread to the shank adjacent the eye 12 and wrapping the thread to a point substantially midway of the shank. A plurality of strands of material consisting of several strands of silk sewing thread and preferably four-strand rayon are then positioned lengthwise of the shank of the hook as shown at 15, in Figure 2. The working thread 14 is then wrapped around the ends of the strands 15 so as to adequately secure them to the shank of the hook.

The next step comprises placing a feather 16 adjacent the hook end of the shank as shown in Figure 3 and wrapping a few turns of the working thread around the feather adjacent its tip in order to initially secure the same to the hook. This feather may be of any suitable type but is preferably a rooster feather and as shown, the tip 17 is left free, and in the finished product, constitutes the tail of the artificial fly.

The feather 16 is then preferably wound twice about the shank of the hook and placed in close proximity to the strands 15 and the working thread 14, as illustrated in Figure 4. These three elements, that is, the feather, strands 15 and working thread 14 are then twisted together, the twist preferably being made to the left as shown in Figure 5. These twisted elements are then spirally wrapped about the shank of the hook and constitute the body portion 18 of the fly. By twisting the feather and strands together in this manner, the veins or webs of the feather will be separated, and stand out from the rest of the body portion and thus simulate the numerous insects which infest trout streams.

It will be noted that the working thread 14 is of sufficient length to adequately secure the body to the hook and still have an end portion for fastening the front elements of the fly to the shank. The next step is that of forming the front portion or hackle, and consists in providing a second feather 19, the end of which is wrapped around the shank adjacent the eye 12. This wrapping operation is continued inwardly in the shank to the front of the body portion. The feather, however, should be of sufficient length to permit the same to be wrapped forwardly to a point adjacent the eye 12. That is, the feather is wrapped first rearwardly to the body portion and then forwardly to the eye 12, this operation being clearly shown in Figures 8 and 9 of the drawing. The working thread 14 is then wrapped forwardly around the front hackle 19 sufficiently to secure the same to the shank. The end of the feather is then severed and the working thread is wrapped around the shank several times directly in rear of the eye and secured preferably by several half hitches. This forms the head 20 of the fly as shown in Figure 10. It is to be understood that after the head is formed, any of the working thread which is left is cut off and as the final operation, the head is varnished, thus completing the fly.

An artificial fly formed in this manner is quite superior to the usual type of fly. By twisting together the strands of the material, the working thread and the rear feather, a strong and durable body portion is formed. Furthermore, by wrapping the front hackle back and forth about the shank of the hook, and then reinforcing it with the working thread, a very strong and durable front hackle portion is produced. We further find that a fly formed in this manner appears quite life-like and also floats on the surface of the water in a manner similar to live flies and insects. Obviously, the fly can be made in many different patterns by changing the color of the feathers and the color of the body material. Furthermore, if desired, the tail 17 may be formed separately from the feather 16 and have a different color than the body feather.

We claim:—

1. An artificial fly comprising a hook, a body portion secured to the shank of the hook and comprising a feather and at least one strand of material twisted together to form a single composite strand wrapped around said shank, and a front hackle secured to said shank in advance of said body.

2. An artificial fly comprising a hook, a body portion secured to the shank of the hook and comprising a feather and strands of material twisted together to form a single composite strand wrapped around said shank, and a front hackle secured to said shank in advance of said body and comprising a feather wrapped back and forth about the front of said shank, one of said strands of material being extended and wrapped around the front hackle feather to secure the same on the hook.

3. The method of making artificial flies consisting in securing a group of strands of material to the shank of a hook and leaving the major portions of the strands free, applying a feather to the shank of the hook, twisting the strands and feather together to form a single composite strand, and finally wrapping the composite strand around the shank to form the body portion of the fly.

4. The method of making artificial flies consisting in securing a group of strands of material to the shank of a hook and leaving the major portions of the strands free, applying a feather to the shank of the hook so as to leave one end of the feather projecting outwardly from the hook to form the tail of the fly, twisting the strands and feather together to form a single composite strand, and finally wrapping the composite strand around the shank to form the body portion of the fly.

5. The method of making artificial flies consisting in securing a working thread to the shank of a hook, placing a group of strands of material on the shank of the hook, wrapping the working thread about the strands and shank so as to leave the major portions of the strands free, applying a feather to the shank of the hook, twisting the working thread, strands and feather together to form a single composite strand, and finally wrapping the composite strand around the shank to form the body portion of the fly.

6. The method of making artificial flies consisting in securing a group of strands of material to the shank of a hook and leaving the major portions of the strands free, applying a feather to the shank of the hook, twisting the strands and feather together to form a single composite strand, wrapping the composite strand around the shank to form the body portion of the fly, and finally wrapping a feather about the shank in advance of the body portion to form a front hackle.

7. The method of making artificial flies consisting in securing a working thread to the shank of a hook, placing a group of strands of material on the shank of the hook, wrapping the working thread about the strands and shank so as to leave the major portions of the strands free, applying a feather to the shank of the hook, twisting the working thread, strands and feather together to form a single composite strand, wrapping the composite strand around the shank to form the body portion of the fly, wrapping a feather about the shank in advance of the body portion to form a front hackle, and finally wrapping the end of the working thread about the front feather to secure the same to the hook and complete the fly.

8. The method of making artificial flies consisting in securing a working thread to the shank of a hook, placing a group of strands of material on the shank of the hook, wrapping the working thread about the strands and shank so as to leave the major portions of the strands free, applying a feather to the shank of the hook, twisting the working thread, strands and feather together to form a single composite strand, wrapping the composite strand around the shank to form the body portion of the fly, wrapping a feather inwardly from the eye of the hook to the front of the body portion and then back again to the eye of the hook to form a front hackle, and finally wrapping the end of the working thread about the front feather to secure the same to the hook and complete the fly.

9. The method of making artificial flies consisting in securing at least one strand of material to the shank of a hook and leaving a portion of the strand free, applying a feather to the shank of the hook, twisting the strand and feather together to form a single composite strand, and finally wrapping the composite strand around the shank to form the body portion of the fly.

10. An artificial fly comprising a hook, a body portion secured to the shank of the hook and comprising a working thread, strands of silk and a feather twisted together to form a single composite strand wrapped around said shank, and a front hackle secured to the said shank in advance of said body.

RAYMOND WOODHEAD.
HARRY WOODHEAD.